Sept. 8, 1953 G. L. FREDENDALL 2,651,673

FREQUENCY DISCRIMINATORY SYSTEM

Filed Sept. 20, 1949 2 Sheets-Sheet 1

INVENTOR
GORDON L. FREDENDALL
BY [signature]
ATTORNEY

INVENTOR
GORDON L. FREDENDALL
BY [signature]
ATTORNEY

Patented Sept. 8, 1953

2,651,673

UNITED STATES PATENT OFFICE 2,651,673

FREQUENCY DISCRIMINATORY SYSTEM

Gordon L. Fredendall, Feasterville, Pa., assignor to Radio Corporation of America, a corporation of Delaware Application September 20, 1949, Serial No. 116,801

5 Claims. (Cl. 178—5.4)

The present invention relates to methods and circuits for providing predetermined amplitude vs. frequency characteristics and phase vs. frequency characteristics in translating electrical signals.

In more particularity, although not necessarily exclusively, the present invention deals with electrical circuit arrangements and methods for dividing complex electrical signals into predetermined groups of frequency components such that the phase relationship of the components held in the original signal is not altered in their separated form.

In other aspect, the present invention relates to improved circuit arrangement and techniques for use in separating the video signal components appearing in the individual color channels of color television systems in order to accomplish routing and combining of signal components to reduce the required band width of the color television system without, however, producing distortion in the television color image due to undesirable phase shift between the frequency components of the color television signal.

There is often encountered in the electrical art, the need for separating complex waveform signals into certain bands of frequency components. Suitable filter networks having predetermined amplitude vs. frequency pass characteristics may be, of course, used either singly or in combination to produce most any desired frequency separation schedule of a given signal, provided sufficient complexity and expense can be tolerated in the construction of the filter network. However, even at best, the phase relationship between the various separated components permitted by a given filter network or combination of networks is generaly altered from those phase relationships existing in the original complex signal.

In numerous types of electrical equipment and circuit arrangements, this phase distortion between separated frequency components of a given signal is not of great importance as, for example, where each separated component signal range is designated for a particular function which is unrelated to the function performed by the other separated frequency components. On the other hand, where the separated frequency components are to be later combined to form at least in part, the intelligence represented in the original signal, the phase relationship between the frequency elements must necessarily bear exactly the same phase relationship originally established in the original complex signal before frequency separation.

Perhaps the need for what will be called "phase distortionless" frequency separation of complex signals is no more sharply defined than in modern day color television systems, particularly of the "mixed high" variety as described in a U. S. Patent No. 2,634,324 issued April 7, 1953, to Alda V. Bedford. In this particular color television system each of the primary color channels is separated into high and low frequency components with the low frequency components directly modulating respective color channels of a transmitting medium. The high frequency components of each channel are then mixed with one another and superimposed, in part, upon one of the channels for concomitant transmission with the low-frequencies of that particular channel. Color television images having the appearance of high image detail may thereby be transmitted at a great reduction in band width. It can readily be seen, however, that the correct phase relationship between the high frequency components of a given color channel and the low frequency components of that channel must be maintained at all times, even when the high frequency components are in mixed form or otherwise the reproduced image will be badly distorted. The phase distortion of presently known practical filter networks having high pass and low pass characteristics suitable for diverse applications, have not been found sufficiently small to eliminate visible evidences of this phase distortion in the reproduced television image.

It is therefore a purpose of the present invention to provide a novel circuit arrangement and method for separating complex signal frequencies into frequency components which after separation bear substantially the same relationship as originally established in the complex signal.

It is further a purpose of the present invention to provide a new and improved apparatus and method for separating a given signal waveform into its high and low frequency components such that the phase relationship between the high and low frequency components remains sufficiently undisturbed in the separating action to permit ready combining of these components to form an accurate representation of any intelligence carried by the complex waveform.

It is moreover an object of the present invention to provide a new and improved frequency separating circuit for use in color television channels in which it is desired to separate the channel color signal into low and high frequency components which components are later to be combined in part with signals from other color channels in the system to form a reduced band width color television signal.

In one or its more general forms, the novel frequency separating apparatus and method of the present invention contemplates the use of two circuits to whose inputs is separately applied the electrical signal whose frequency components are to be separated. The first circuit is provided with predetermined phase shift vs. frequency characteristic and an amplitude vs. frequency characteristic providing passage of only a predetermined range of frequencies. The second circuit is provided with a phase shift vs. frequency characteristic which is substantially identical to that of the first circuit but whose amplitude vs. frequency characteristic provides passage of a range of frequencies which at least embraces a portion of the band pass characteristic of the first circuit and extends therebeyond. The output of the first and second circuits are then subtractively combined so as to cancel all frequency components passed by the first circuit, thereby allowing those frequency components in common to the pass band characteristic of the first and second circuits to be extracted from the output of the combining mechanism while allowing those frequency components common to the pass band characteristic of the first and second circuits to be extracted from the output of the first circuit. Since the separated frequency components are in a sense reciprocally or complementarily derived, there can exist no relative phase displacement between the signal components, thereby permitting their future recombination to faithfully reconstruct the intelligence borne by the signal undergoing separation.

In one of its more specific forms for the separation of a color television channel into low and high frequency components, the present invention contemplates the use of a low pass filter having a substantially linear phase characteristic and a time delay circuit having a linear phase shift characteristic equal to a low pass filter but exhibiting a substantially flat amplitude vs. frequency characteristic over the entire range of color channel frequencies. Color channel signal is therefore applied concomitantly to the inputs of the low pass and delay circuits, while the outputs of the circuits are combined subtractively to cancel all low frequency components communicated by the low pass filter. High frequency color components may then be extracted from the output of the combining means while the low frequency components may be taken directly from the output of the low pass frequency. Again since the low and high frequency components were in a sense reciprocally derived, no undesirable phase change between the high and low frequency components has been suffered.

A more complete understanding of the operation of the present invention, as well as many other of its objects and features of advantage in addition to those set forth hereinabove, will become apparent from the perusal of the following specification especially when considered in combination with the accompanying drawings in which.

Figures 1, 2, 4, 5:
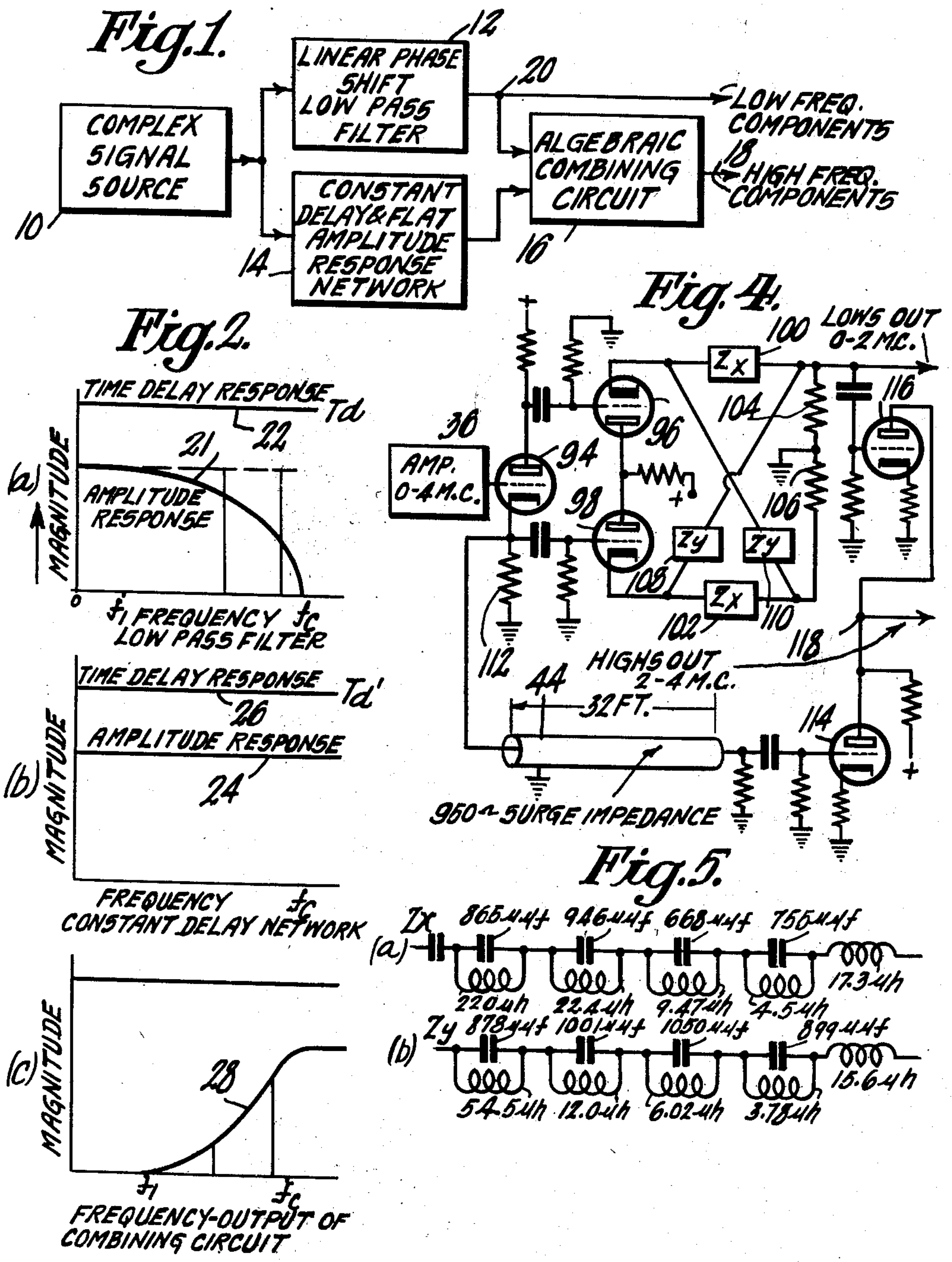
Figure 1 is a diagrammatic representation, in block form, of the present invention in one of its more general forms.
Figure 2 is a graphic representation of certain electrical characteristics of the arrangement shown in Figure 1.
Figure 4 is a combination diagrammatic and schematic representation of an exemplary circuit arrangement suitable for carrying out the teaching of the present invention.
Figure 5 is a schematic representation of certain elements shown in block form in Figure 4.

Turning now to Figure 1, there is indicated by block 10 a source of complex signal which it shall be assumed is to be divided into its lower and higher frequency components without producing deleterious relative phase shift between the low and high frequency components when separated. The output of the complex signal source 10 is then, according to the present invention, applied to the input of the linear phase shift low pass filter circuit 12 and the input of a constant delay circuit having a flat amplitude response 14. The outputs of the low pass filter and constant delay circuit are then applied to a suitable form of combining circuit such as indicated by the block 16. The combining circuit is such as to permit cancellation of those frequency components common to the pass characteristics of both the low pass filter and constant delay network. High frequency components of the signal derived from the complex signal source 10 will then be available at the output 18 of the alegbraic combining circuit while the low frequency components of the complex signal will be available at the output terminal 20 of the low pass filter arrangement 12.

Operation of the present invention as illustrated in Figure 1 will be more clearly discerned by reference to the curves in Figure 2. In Figure 2*a* there is shown by way of example a typical amplitude vs. frequency characteristic curve 21 for the low pass filter 12 which illustrates that the filter 12 is capable of passing all frequencies from zero cycles per second up to some nominal cut-off frequency $f_c$. The low pass filter 12 may have any predetermined phase shift vs. frequency characteristic, but it is perferably designed to exhibit substantially linear phase shift over the entire pass band of the filter. This linear phase shift will then correspond to some fixed time delay $t_d$ for all signals as indicated by the curve 22 in Figure 2*a*. The network 14 of Figure 1 is then, in accordance with the present invention, provided with a flat amplitude vs. frequency response from the lowest frequency passed by the low pass filter 12 up to the highest frequency component it is desired to obtain from the complex signal. This flat amplitude vs. frequency response may be represented by the curve 24 in Figure 2*b*. The network 14 is further designed to display the same phase shift vs. frequency characteristic as that displayed by the low pass filter 12, at least over the pass band frequency range of the low pass filter. In the case of the exemplary linear phase shift characteristic for the filter 12, as indicated by curve 22 in Figure 2*a*, the phase shift vs. frequency for the flat amplitude network would also be substantially linear resulting in a constant time delay $t_d^1$ indicated by the curve 26 in Figure 2*b* which time delay would be equal to $t_d$ of the low pass filter.

If then, the signal outputs of the low pass filter 12 and the flat amplitude network 14 are properly adjusted in amplitude and applied to some form of combining circuit which will allow cancellation of the low frequency components concomitantly passed by both the low pass filter 12 and the flat amplitude response 14, the output of such a combining circuit 16 will represent only the higher frequency components of the applied complex signal. The lower frequency components of the complex signal will, of course, be available at the output of the low pass filter. The evidenced output amplitude versus frequency characteristic of the combining circuit 16 will then appear substantially as shown by curve 28 in Figure 2*c*, the shape of this curve being substantially the reciprocal of the curve 21 in Figure 2a. It will be manifest that the exact cancellation of appropriate low frequency components in the combining circuit to produce the output curve 28, having reciprocal characteristics of the filter curve in Figure 2a, is possible only under conditions of similar phase characteristics in the networks 12 and 14 over their common pass range. Accordingly, although a linear phase shift characteristic has been illustrated, it is clear that any phase shift versus frequency characteristic, if common to both the networks 12 and 14, would operate in accordance with the present invention.

However, if as illustrated, a linear phase shift characteristic is assigned to the low pass network 12, the constant delay flat amplitude response network 14 may consist solely of a transmission line cut to a length providing a constant time delay of $T_d'$. This latter form of the present invention is quite economical and is particularly suited for application in the individual primary channels of a reduced band width color television system.

A particular form of color television system in which the present invention finds the ready application is of the "mixed highs" type shown and described in the above-referenced U. S. patent issued to Alda V. Bedford. As above explained, in this particular color television system each of the primary color channels is separated into high and low frequency components with the low frequency components directly modulating respective color channels of a suitable color television transmitter. The high frequency components of each channel are then mixed with one another and superimposed, in part, upon one of the channels for concomitant transmission with the low frequencies of that particular channel. Color television images having the appearance of high picture detail may thereby be transmitted at a great reduction in band width over more conventional systems. As stressed above, it is important that the correct phase relationship between the high frequency components of a given color channel and the low frequency components of that channel be maintained at all times or otherwise distortion in the reproduced image will result.

Figure 3:
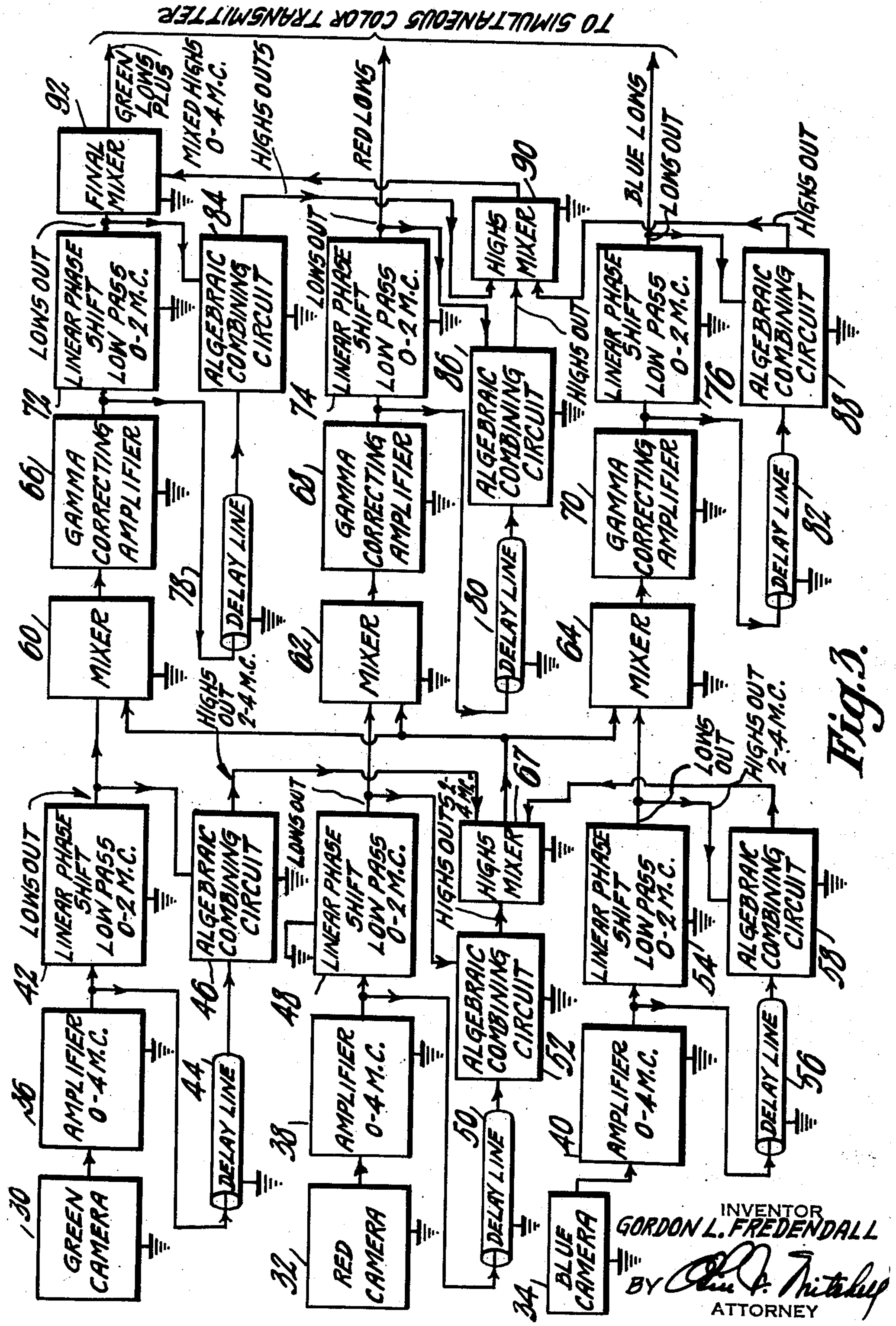
Figure 3 is a diagrammatic representation in block form of a color television system embodying the present invention.

The television system of Figure 3 illustrates such a mixed-high system having three color channels each initiated by a respective color camera, namely, the green channel by camera 30, the red channel by camera 32 and the blue channel by camera 34. The output of each camera is then applied to an amplifier having a 4 mc. band width such amplifiers being shown at 36, 38 and 40. The color signals in each channel are then divided into low and high frequency components by means of the low pass filter, delay line and combining circuit arrangement provided by the present invention as explained in connection with Figure 1. This frequency separating circuit in the green channel is represented by the elements 42, 44 and 46 respectively, while in the red channel the low pass filter is shown by a block 48, the delay line at 50 and the combining circuit at 52. The blue channel is accordingly provided with the low pass filter delay line and combining circuit respectively shown at 54, 56 and 58. As indicated in Figure 1, the low frequency components of each channel will then be available at the output terminals of the low pass filters 42, 48 and 54, which outputs are then applied to a respective mixer circuit 60, 62 and 64.

In accordance with the mixed high system described by Bedford supra, the low pass filters are assigned the pass band of approximately 2 mc. thereby passing virtually all signal components from zero to 2 mc. for application to the respective signal mixers 60, 62 and 64 connected with the outputs of the low pass filters. The high frequency components provided by the present invention appearing at the output of the algebraic combining circuits 46, 52 and 58 and representing signal frequency components in the range between 2 and 4 mc. for each color channel, are then mixed together in the highs mixer circuit 67 as taught by Bedford. The output of the highs mixer 66 is then applied to the second input of the signal mixers 60, 62 and 64 for mixing with the low frequency components passed by the low pass filters of all the color channels. Again in accordance with Bedford, the output of the mixer circuits 60, 62 and 64 are conducted to respective gamma correcting amplifiers 66, 68 and 70 which correct for the non-linearity normally present in kinescope image reproducing tubes employed in the reproduction of the color television image in receiving apparatus. Again the outputs of the gamma correcting amplifiers 66, 68 and 70 are separated into low and high frequency components zero to 2 mc. for the highs and 2 to 4 mc. for the lows. This separation is again most advantageously accomplished by the frequency separating arrangement of the present invention. Therefore, in each channel at the output of the correcting amplifiers there is provided a low pass filter such as 72, 74 and 76, a delay line such as 78, 80 and 82 and an algebraic combining circuit such as 84, 86 and 88. The high frequency components appearing at the outputs of the algebraic combining circuits 84, 86 and 88 are again combined in a highs mixer circuit 90. This time, however, the output of the highs mixer circuit is applied for mixing with the low frequency components of only the green channel through the agency of the final mixer 92. Thus, the color channel signals applied for transmission to a color transmitter then comprises a green channel signal 4 mc. wide, a red channel signal 2 mc. wide and a blue channel signal 2 mc. wide. This, of course, represents a reduction in band width of 4 mc. over the conventional simultaneous color system requiring 4 mc. for each color channel.

As noted above, the success of the above described Bedford mixed highs system depends to a large extent upon the ability of separating the high and low frequency components of each channel and later combining them as shown, without producing any change in their phase relationships. By way of example of a suitable circuit arrangement for carrying out the present invention in connection with the green channel of the color television system of Figure 3, the circuit of Figure 4 is given. Here, the output of the amplifier 36 may be applied to the input of an ampliger tube 94 arranged for conventional push pull drive of the two amplifier tubes 96 and 98. The tubes 96 and 98 are further arranged as a typical push pull amplifier having connected in their respective cathode circuits the low pass filter elements 100 and 102 and series resistance elements 104 and 106 to ground. The cross elements 108 and 110 of the lattice type low pass filter are shown in their typical crossed lattice connections. The output of the low pass filter designed to pass zero to 2 mc. is then selected from across one of the cathode resistances 104 or 106 which terminate the latticed filter. Since the low pass filter offers a push pull output in the connection shown, selection of the particular arm of the push pull output to be used is governed by the particular phase relationship of the signal appearing at an output arm relative to the input signal applied to the phase inverting amplifier 94. The mode of this selection will be considered presently.

In accordance with the present invention, the signal then appearing across the cathode resistance 112 of the phase inverting amplifier 94, being in phase with the signal appearing at the output of the amplifier 36, may then be applied to a delay line 44 whose output signal is, in turn, applied to the input of one of the combining circuit amplifiers 114. The other combining circuit amplifier 116, in parallel with the amplifier 114, is then supplied with signal from that branch of the low pass filter providing signals which are the closest to 180° out of phase with the output of the amplifier 36. Since as described above, the phase shift versus frequency characteristic of the low pass filter comprising elements 100, 102, 108 and 110 is made the same as that provided by the delay transmission line 44, the low frequency components will cancel in the output circuits of the combining amplifiers 114 and 116 thereby providing at the output terminal 118 of the combining amplifier only the higher frequency components of the full 4 mcs. The low frequency components zero to 2 mc. will, of course, be available at the upper terminal of the resistor 104 in the low pass filter circuit.

There is shown in Figures 5*a* and 5*b* suitable networks for the arms $Z_x$ and $Z_y$ of the low pass filter of Figure 4 with the arms $Z_x$ (elements 100 and 102) of the low pass filter constructed as in Figure 5*a* and the arms $Z_y$ (elements 108 and 110) constructed as indicated in Figure 5*b* the low pass filter will have a substantially linear phase shift characteristic over its pass frequency range. This linear phase shift characteristic, which represents a substantially constant time delay for all signal frequencies, may be equivalently produced by a 32 foot section of 950 ohm surge impedance transmission line as indicated in Figure 4. The transmission line itself will, of course, have virtually a flat frequency response characteristic, hence the conditions demanded by the novel arrangement of the present invention for phase distortionless frequency separation are obtained. It is to be noted that the arms $Z_y$ and $Z_x$ as indicated in Figure 5, may be interchanged if desired to produce a similar low pass frequency characteristic, but, however, with the push pull phase of the network itself reversed by 180°. Under such conditions and with the particular combining circuit shown, the input to the combining amplifier 116 would be alternatively derived from the lower end of the resistance element 106.

It will be appreciated that the utility of the present invention is, in no way, limited by the particular circuit arrangements employed herein for its description. Furthermore, the particular parametric orientation and circuit values shown in Figure 5 for the low pass filter in Figure 4, is only exemplary and may be altered in a variety of ways to produce other suitable characteristics for the low pass filter. Under such conditions, of course, the length and surge impedance of the transmission line may be appropriately altered to provide the necessary time delay or phase shift versus frequency response. In some instances, equalization of the transmission line 44 may be necessary to correct for discrepancies in phase versus frequency response. Again the transmission line itself may be replaced by any suitable network having the proper phase and amplitude characteristics relative to change in frequency.

From the foregoing, it can be seen that the present invention has provided a simple and economical frequency discriminatory system which is readily applicable to many forms of communication equipment wherein it is desired to effect frequency separation of a signal with a minimum of phase distortion.

Having thus described the invention, what is claimed is:

1. In a color television system having apparatus for producing three primary color signal channels of predetermined band widths, in combination, a separate amplifier for handling the bandwidth of each color channel, a frequency separating circuit connected with the output of each amplifier for parting the color channel signals into low and high frequency components, each of said separating units comprising, a low pass system constituted to pass the low frequency components of the channel with a predetermined phase shift vs. frequency characteristic, a band pass system adapted to communicate both said high and low frequency components with a phase shift vs. frequency characteristic having a portion thereof corresponding to said low pass system phase shift vs. frequency characteristic, means for combining the outputs of said low pass and band pass system in such relation to cancel low frequency components in said combining means, whereby high frequency components of each color channel is made available at the output of each combining means, while the low frequency components of each channel is made available at the output of said low pass system, the low and high frequency components being in phase with one another in the cross over range between the low pass output of the low pass system and the high frequency output of said combining means.

2. Apparatus according to claim 1 wherein said low pass system is a passive low pass filter network having a substantially constant time delay vs. frequency characteristic and wherein said bandpass system is a transmission line cut to a length yielding the same signal time delay as said low pass system.

3. Apparatus according to claim 1 wherein the means are additionally provided for mixing the high frequency outputs of said three combining means to produce a mixed highs signal, separate channel mixing means for mixing a portion of said mixed highs signal with the low frequency output of each of said low pass systems, a separate non-linear amplifier for each channel, connections applying the output of each of said channel mixing means to the input of the non-linear amplifier in its respective channel, a separate frequency separating network in each channel connected with the output of the respective non-linear amplifier to separate the output of said amplifiers into low and high frequency components, each of said separating circuits comprising a low pass system constituted to pass the low frequency components of the channel with a predetermined phase shift vs. frequency characteristic, a band pass system adapted to communicate both said high and low frequency components with a phase shift vs. frequency characteristic having a portion thereof corresponding to said low pass system phase shift vs. frequency characteristic, means for combining the outputs of said low pass and band pass system in such relation to cancel low frequency components in said combining means, whereby high frequency components of each color channel is made available at the output of each combining means.

4. Apparatus according to claim 3 wherein said low pass system is a passive low pass filter network having a substantially constant time delay vs. frequency characteristic and wherein said band pass system is a transmission line cut to a length yielding the same signal time delay as said low pass system.

5. Apparatus according to claim 3 wherein the means are additionally provided for mixing the high frequency outputs of said combining means to produce a second mixed highs signal, a single mixing circuit connected for mixing with the output of one of said last named low pass systems, a portion of the second mixed highs signal, means for conducting the output of said single mixing circuit with one color of a transmission system, means for respectively connecting the outputs of the last named low pass systems, in the channels not containing said single mixing means, to two other color channels of the transmission system.

GORDON L. FREDENDALL.

References Cited in the file of this patent

UNITED STATES PATENTS

| Number | Name | Date |
|---|---|---|
| 1,759,952 | McCurdy | May 27, 1930 |
| 1,902,031 | Holden | May 21, 1933 |
| 2,272,638 | Hardy | Feb. 10, 1942 |
| 2,335,180 | Goldsmith | Nov. 23, 1943 |
| 2,387,783 | Tawney | Oct. 30, 1945 |
| 2,461,515 | Bronwell | Feb. 15, 1949 |